Patented Mar. 16, 1948

2,437,870

UNITED STATES PATENT OFFICE 2,437,870

PROCESS OF TREATING SULFIDIC TUNGSTEN ORE CONCENTRATES

Thomas Jefferson Williams, Buenos Aires, Argentina

No Drawing. Application September 29, 1942, Serial No. 460,118

6 Claims. (Cl. 23—22)

The invention relates to the chemical purification of sulfidic tungsten ore concentrates and the recovery of bismuth and tungstic acid thereof which may be scheelite or wolframite or other tungsten ores and which have been concentrated by the well known mechanical means, among which may be included flotation, to a grade of 50% tungstic oxide and more. Such concentrates frequently still contain impurities of other metals, for instance, bismuth and copper as sulfides, which it is desirable to remove previous to the ores being used for industrial purposes.

In this case one has, so far, subjected the ores to an oxydizing roasting, thus converting the sulfides into sulfates, and then leached them out more easily. But this process seems to require a very prolonged roasting time and causes a great loss of heat as the air has to be given ample access to the ore while it is being fired. Using, on the other hand an oxydizing agent such as nitric acid will rather lead to an attack upon the tungsten ore itself than upon the sulfides.

The present invention is based upon the fact that not the tungsten ore but the sulfides of bismuth and copper are first attacked by hydrochloric or diluted sulfuric acid in the presence of solid oxydizing agents which release free chlorine or oxygen which in their turn convert the sulfides of bismuth and copper into chlorides or sulfates and free sulfur, or even oxydizes the latter. At the same time the free chlorine or oxygen brings the copper from its univalent form, as which it is sometimes present in its sulfide $Cu_2S$, into its bivalent form, the salts of which are far more soluble than those of the univalent one.

The solid oxydizing agents must be such that they are efficient in the acids named, as sodium— or other nitrates, chlorates, peroxydes, perborates, and many other per-compounds. As well the free acids of these oxydizing agents might be used as far as they do exist, but it has been found that the solid salts are much more efficient than the equivalent amount of the liquid acids, provided they are thoroughly mixed with the ore and the liquid added to it afterwards. The reason for this may be that in this case the whole of the free chlorine or oxygen is formed in a more intimate contact with the ore and therefore acts in statu nascendi, while a mixture of hydrochloric and nitric acids, for example, when simply poured upon the ore, will release a great deal of the active gases in the overstanding liquid which is not in contact with the ore itself. It must not be forgotten that with tungsten concentrates, due to their high specific gravity, the volume of acid required even for smaller contents of bismuth and copper will be rather large, as a considerable quantity of acid is always required for the decomposition of the oxydizing agent, and apart from that there still has to be present a fair surplus of acid after the conclusion of the reaction in order to prevent the formation of insoluble bismuth oxy-salts which might make the whole treatment inefficient. Furthermore the stirring of such heavy material as tungsten ore in a wet state is a difficult matter. Generally, the solid oxidizing agents should be present in amounts at least sufficient for the decomposition of the bismuth and copper sulphides present. The oxidizing agents should be taken somewhat, or even considerably, in excess, because other sulphates (pyrite, for instance), if present will consume acid as well as oxidizing agents in indeterminate amounts. The latter may be said of the Bi and Cu sulphides themselves, because it is very difficult to ascertain to what degree the sulphur is oxidized, viz., whether to free $S_1$, $SO_2$ or $SO_3$. If part of it is quickly oxidized to the highest oxide, less oxidizing agents are available, from a given amount, for the remaining sulphide. Hence the necessity of a small-scale test for each bulk prior to the main treatment. The acids from the leaching process is, after the separation from the concentrate, used for the recovery of the bismuth contained in it. Due to this excess of acid required and the heat of reaction developed during the process, there occasionally occurs a slight attack of the acid upon the ore, decomposing part of it into tungstic oxyde and soluble calcium or iron salt. It has been found, that this is another feature of the invention, that this decomposition of part of the ore may be used for a simple and convenient manufacture of tungstic oxyde or other tungsten products of a very high degree of purity. For this purpose the ore, after all the acid of the leaching process has been removed, is treated with an alkaline solution capable of forming soluble tungstates with tungstic oxyde, as ammonia or caustic soda or potassium. With the first solution an ammonium tungstate solution is formed, while the two latter ones form solutions of sodium or potassium tungstate, which may be easily separated from the rest of the ore. As the acid treatment has yielded a very fine tungstic oxyde which is readily soluble even in cold and dilute alkalies, the second leaching requires much less time than the first.

The acid treatment usually gives two distinctly different types of residual ore containing the free tungstic oxyde owing to the fact that the smaller the particles the more readily they are attacked; the larger lot is thus formed by the larger particles which, after the action upon the ore and the usual stirring, settle down rapidly and contain only a comparatively small amount of the tungstic oxyde, while the smaller particles remain in suspension for a longer period and contain the bulk of the free tungstic oxyde. Due to this remaining in suspension the latter may be syphoned off from the larger grain sizes soon after the acid leaching and, after removal of the acid by filtering and washing be treated with an alkaline solution. Thus it is unnecessary to leach the whole amount of ore and yet possible to recover an overwhelming part of the free tungstic oxyde. The separation according to grain sizes may as well be carried out by screening of the mass or by other known means.

The amount of free oxyde may even be intentionally increased according to the requirements of the production by influencing the attack of the mineral acid and oxydizing agent upon the concentrate by known means, i. e., by raising the temperature, prolonging the time of the attack, increasing the amount of free mineral acid or lowering the average particle size of the concentrate. By each of these means the attack is increased while by the reverse means it may be readily diminished if desired. Another means of increasing or even producing the free tungstic acid consists in attacking the finer grain sizes of the ore with mineral acid after their separation from the main lot.

The quantities of acid as well as of oxydizing agent applied in each case depend of course on the amounts of bismuth, copper and other sulfides present in the concentrate, and not only the acid, but the oxydizing agent too, should be somewhat in excess of the theoretical values, because the attack upon the sulfides occurs sometimes slower than the development of the active gases, owing to the interlocking of the material. Therefore it is difficult to state off hand the exact amounts of reagents to be applied to a concentrate of known composition, and generally the quantities to be used have to be tried out in a test with a small part prior to the treatment of the main lot, which is carried out in the following manner: An average sample of the bulk of the mineral to be treated is prepared in the usual way, and assayed. According to the result of the assay, (i. e., the amounts of Cu, Bi and S) present, the amounts of oxydizing agents and acid required are computed and then the computed amount, plus varying amounts in excess thereof, are tried out in successive smaller parts of the sample, applying some excess of each. The amounts which give the desired results regarding the removal of copper and bismuth, are then applied to the bulk of the mineral to be treated.

Regarding the nature of the oxydizing agents, sodium nitrate has proved to be quite efficient in most cases, but far more so is manganese-dioxide in the well-known form of the mineral pyrolusite, particularly for the attack upon the copper sulfides. The sodium as well as the manganese compounds formed are leached out by a simple washing process, but applying pyrolusite in the large quantities required for a wholesale decomposition of the sulfides present causes always an increased consumption of hydrochloric acid and, in addition to that, there always remains an increased amount of gangue in the ore from the undissolved gangue of the pyrolusite. On the other hand, just manganese dioxide in sufficient amount has the effect of oxydizing the sulfur, or at least a considerable part of it, to sulfuric acid, which is leached out by the washing, too, thus allowing to do away with, or at least to diminish the time of, the roasting afterwards.

According to the invention it has been found that a particularly good result is obtained by using only part of the pyrolusite require for the decomposition of the sulfides for instance, only 10% instead of 60%, referred to the concentrate, and taking, in addition, a corresponding amount of sodium nitrate to replace the missing pyrolusite. The ratio of sodium nitrate to pyrolusite (considered as 100% $MnO_2$) is preferably between 8:1 and 4:1, using still less of the second component, if not much sulfur is present. Mixtures of other oxydizing materials are as well to be considered as lying within the scope of this invention.

The following two examples will illustrate the principles laid down in the invention: I. A scheelite concentrate of the original composition (1) was ground to 60 mesh size, intimately mixed with 3% of its weight of pyrolusite containing 70% $MnO_2$ and 15% sodium nitrate of the same mesh sizes and treated with 80% by weight of concentrated hydrochloric acid. The result (2) shows a nearly complete elimination of the bismuth and a reduction of the copper to nearly half its previous value. For comparison, a mixture of the ore with the same amount of pyrolusite, but without nitrate, was treated with 18% by weight of concentrated nitric acid and 80% hydrochloric acid, but in this case (3) the copper was diminished to a much lower degree. Even increasing the pyrolusite to 5% and the hydrochloric acid to 90%, as sample (4) shows clearly, does not alter the results much. From this may be seen that the application of solid oxydizing agents is far more efficient than that of liquid ones.

|   | Treated with— | | | | Assaying as— | | |
| --- | --- | --- | --- | --- | --- | --- | --- |
|   | Per cent nitric acid | Per cent sodium nitrate | Per cent hydrochloric acid | Per cent pyrolusite | Per cent $WO_3$ | Per cent Bi | Per cent Cu |
| 1 | ---- | ---- | ---- | ---- | 59.52 | 6.94 | 0.30 |
| 2 | ---- | 15 | 80 | 3 | 72 | 0.08 | 0.17 |
| 3 | 18 | ---- | 80 | 3 | 72 | 0.06 | 0.25 |
| 4 | 18 | ---- | 90 | 5 | 72 | 0.11 | 0.23 |

II. A scheelite concentrate of 60 mesh size mixed with 5% by weight of pyrolusite containing 70% $MnO_2$ and 20% by weight of sodium nitrate of about the same mesh, was treated with 60% by weight of concentrated hydrochloric acid during 6 hours, frequently stirring it. The acid was then separated from the ore, adding to it the diluted acid from washing the ore, and treated with lime to recover the bismuth. In another sample, the same concentrate, mixed with the same percentages of nitrate and pyrolusite, was treated with 70% hydrochloric acid. The results of these treatments will be seen from the following table:

|   | Per cent $WO_3$ Total | Per cent $WO_3$ free | Per cent Bi | Per cent Cu | Per cent S |
| --- | --- | --- | --- | --- | --- |
| Original concentrate | 65.02 | -------- | 4.52 | 0.37 | 2.39 |
| Ore after treatment with 60% HCl | 72.24 | 0.90 | 0.16 | traces | 1.10 |
| Ore after treatment with 70% HCl | 73.12 | 7.03 | 0.16 | traces | 0.99 |

The only practical difference between the two treatments with 60 viz 70% hydrochloric acid therefore lies in the amount of free tungstic oxyde released by the application of more acid. This tungstic oxyde was then recovered by leaching the washed, wet ore of the 70% treatment with a solution of seven parts of ammonia (0.89 spec. gr.) in twelve parts of water. The speed of solution of the oxyde was increased by stirring the ore and keeping the temperature at about 50° C. The leached ore was washed with fresh ammonia solution which afterwards was used for further leaching. The saturated solution of ammonium tungstate was then evaporated to about one-fifth of its volume allowing ammonium para-tungstate to crystallize out, which after being filtered was washed with cold water and converted into other tungsten compounds in the known ways.

What I claim is:

1. A process of purifying sulphidic tungsten ore concentrates containing sulphides of the group consisting of bismuth and copper and mixtures thereof, said process comprising the steps of mixing the concentrates with sodium nitrate and manganese dioxide, contacting the mixture with an acid of the group consisting of hydrochloric acid, sulphuric acid and mixtures thereof and separating the liquid from the ore.

2. A process of purifying sulphidic tungsten ore concentrates containing sulphides of the group consisting of bismuth and copper and mixtures thereof, said process comprising the steps of mixing the concentrates with sodium nitrate and manganese dioxide, the ratio of sodium nitrate to manganese dioxide being between 8:1 and 4:1, contacting the mixture with an acid of the group consisting of hydrochloric acid, sulphuric acid and mixtures thereof and separating the liquid from the ore.

3. A process of purifying sulphidic tungsten ore concentrates containing sulphides of the group consisting of bismuth and copper and mixtures thereof, and including at least bismuth sulphide, said process comprising the steps of mixing the concentrates with sodium nitrate and manganese dioxide, contacting the mixture with an acid of the group consisting of hydrochloric acid, sulphuric acid and mixtures thereof to thereby form free tungstic oxide and an acid solution containing bismuth, separating the acid solution from residual concentrates, leaching the residual concentrates with an alkaline solution so as to dissolve the free tungstic oxide from the concentrate, and separating the alkaline solution of the tungstic oxide from the residual concentrates.

4. A process of purifying sulphidic tungsten ore concentrates containing bismuth sulphide, said process comprising the steps of mixing the concentrates with sodium nitrate and manganese dioxide, contacting the mixture with an acid of the group consisting of hydrochloric acid, sulphuric acid and mixtures thereof thereby forming an acid solution containing dissolved bismuth compounds, separating the acid solution from the residual concentrates and recovering the bismuth compounds from the acid solution.

5. A process of purifying sulphidic tungsten ore concentrates containing bismuth sulphides, said process comprising the steps of mixing the concentrate with sodium nitrate and manganese dioxide, contacting the mixture with an acid of the group consisting of hydrochloric acid, sulphuric acid and mixtures thereof, thereby forming free tungstic oxide and an acid solution containing dissolved bismuth compounds, separating the acid solution from residual concentrates containing finer grain sizes, recovering the bismuth compounds from the acid solution, and leaching the finer grain sizes of the residual concentrate with a solvent selected from the class consisting of ammonia and alkaline solutions so as to recover the free tungstic oxide as tungstates.

6. A process of purifying sulphidic tungsten ore concentrate containing bismuth sulphide which comprises mixing the concentrates with sodium nitrate and manganese dioxide, the ratio of sodium nitrate to manganese dioxide being between 8:1 and 4:1, contacting the mixture with an acid of the group consisting of hydrochloric acid, sulphuric acid and mixtures thereof, thereby forming free tungstic oxide and an acid solution containing dissolved bismuth compounds, separating the acid solution from residual concentrates comprising finer grains and coarser grains, recovering the bismuth compounds from the acid solution, separating the finer grains from the coarser grains of the residual concentrate, and leaching the finer grain sizes with a solvent selected from the class consisting of ammonia and alkaline solutions so as to recover the free tungstic oxide as tungstates.

THOMAS JEFFERSON WILLIAMS.

REFERENCES CITED

The following references are of record in the file of this patent:

UNITED STATES PATENTS

| Number | Name | Date |
|---|---|---|
| 1,049,193 | Ban | Dec. 31, 1912 |
| 1,081,566 | Becket | Dec. 16, 1913 |
| 1,217,914 | Butterfield | Mar. 6, 1917 |
| 1,277,475 | Pfanstiehl | Sept. 3, 1918 |
| 1,483,567 | Anjow | Feb. 12, 1924 |
| 1,895,811 | Morgan | Jan. 31, 1933 |
| 2,017,557 | Winkler et al. | Oct. 15, 1935 |
| 2,238,250 | Curtis | Apr. 15, 1941 |

FOREIGN PATENTS

| Number | Country | Date |
|---|---|---|
| 425,364 | Germany | Feb. 17, 1926 |